United States Patent
Diehl et al.

(10) Patent No.: US 7,781,373 B2
(45) Date of Patent: Aug. 24, 2010

(54) STABILIZED DYES FOR THERMAL DYE TRANSFER MATERIALS

(75) Inventors: Donald R. Diehl, Rochester, NY (US); Shari L. Eiff, Rush, NY (US); Christine J. Landry-Coltrain, Fairport, NY (US); Gary M. Russo, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 801 days.

(21) Appl. No.: 11/626,890

(22) Filed: Jan. 25, 2007

(65) Prior Publication Data

US 2008/0182212 A1 Jul. 31, 2008

(51) Int. Cl.
*B41M 5/035* (2006.01)
*B41M 5/50* (2006.01)

(52) U.S. Cl. ............... 503/227; 106/31.43; 106/31.47; 8/471

(58) Field of Classification Search ............ None
See application file for complete search history.

(56) References Cited

U.S. PATENT DOCUMENTS

| | | | |
|---|---|---|---|
| 4,621,271 A | 11/1986 | Brownstein | |
| 4,695,287 A | 9/1987 | Evans et al. | |
| 4,705,522 A | 11/1987 | Byers | |
| 4,855,281 A | 8/1989 | Byers | |
| 4,902,787 A * | 2/1990 | Freeman | 534/800 |
| 4,990,484 A | 2/1991 | Nakamura | |
| 5,024,990 A | 6/1991 | Chapman et al. | |
| 5,134,115 A | 7/1992 | Diehl et al. | |
| 5,252,530 A | 10/1993 | Nakamura | |
| 5,288,691 A | 2/1994 | Vanier et al. | |
| 5,342,728 A | 8/1994 | Henzel | |
| RE34,737 E | 9/1994 | Niwa et al. | |
| 5,618,773 A | 4/1997 | Bailey et al. | |
| 5,620,941 A | 4/1997 | Van Hanehem et al. | |
| 5,627,129 A | 5/1997 | Kung et al. | |
| 2005/0233902 A1 | 10/2005 | Mizukami | |

\* cited by examiner

*Primary Examiner*—Bruce H Hess
(74) *Attorney, Agent, or Firm*—Lynne M. Blank; J. Lanny Tucker

(57) ABSTRACT

The present invention relates to a cyan dye donor element for thermal transfer imaging comprising a support having thereon a dye layer comprising a mixture of at least two cyan dyes dispersed in a polymeric binder, wherein at least one of the at least two cyan dyes is a light stabilizing dye represented by Formula I and a thermal image recording method utilizing the same cyan dye donor element. The present invention also relates to a cyan inkjet dye comprising a light stabilizing cyan dye represented by Formula I.

20 Claims, No Drawings

STABILIZED DYES FOR THERMAL DYE TRANSFER MATERIALS

FIELD OF THE INVENTION

This invention relates to dye thermal systems used to prepare prints from electronic images, and more particularly to the use of a particular dye compound.

BACKGROUND OF THE INVENTION

Thermal dye diffusion or sublimation transfer systems have been developed to obtain prints from pictures that have been generated electronically, for example, from a color video camera or digital camera. Details of this process and apparatus for practicing it are contained in U.S. Pat. No. 4,621,271 to Brownstein. Thermal dye diffusion or sublimation transfer works by transmitting heat through the donor from the backside to the dye-donor layer. When the dyes in the dye-donor layer are heated sufficiently, they sublime or diffuse, transferring to the adjacent receiving layer of the receiver element.

All imaging dyes are unstable to light to a greater or lesser degree. Dyes are known to photolytically degrade via a number of paths which often involve dye triplet states, radicals and/or singlet oxygen. The light degradation is further known to occur to different degrees depending upon the color of the dyes, i.e.: yellow, magenta, cyan, or mixtures thereof. Multiple dye light stabilizing compounds may be required to significantly improve overall thermal transfer image stability. Each individual dye light stabilizing compound may provide a small improvement which adds to the overall stabilization by a chosen set of materials. Thus, for any given stabilizing compound, any demonstrated improvement in light stability is highly desirable.

Formulations of dye materials and stabilizing compounds can result in different light fastnesses. For example, even if enhanced light fastness of a magenta dye is achieved, that of a cyan dye may not be achieved, resulting in poor color balance of images. In a thermal transfer recording material having formed images, dyes forming yellow, magenta and cyan images exist in an identical layer, in which a dye exhibiting poorest light fastness is affected by the other dyes, resulting in a hue shift in color mixing in the neutral or gray images, leading to apparently deteriorated images.

The stabilizing compound may be incorporated into the dye layer of a donor element, it may be incorporated into a separate donor element, it may be incorporated into a separate portion of a donor element with repeating areas of dyes, or it may be incorporated into the dye receiving element. Incorporation of individual stabilizing compounds has been described in the prior patent literature most notably: U.S. Pat. Nos. 4,705,522, 4,855,281, 5,288.691, 5,342,728, 5,618,773, 5,620,941, 5,627,129, and recently, U.S. Patent Publication 2005/0233902. The materials described in these publications include phenols, epoxy compounds, alkoxy aryl compounds, dialkoxy aryl compounds, trialkoxy aryl compounds, alkyl or cycloalkyl substituted alkoxy aryl compounds, sulfonamido substituted aryl compounds, and hindered amine light stabilizing compounds, for example. The addition of extra stabilizing compounds to a dye donor layer of a dye diffusion thermal transfer donor material can have deleterious effects. For example, the addition of stabilizer to the cyan donor layer will decrease the amount of cyan dye which can be coated in the donor material thus decreasing the maximum density of the cyan image in the receiver resulting from cyan dye transfer. Further the addition of stabilizer to the cyan layer will decrease the amount of cyan dye which will transfer from the donor to the receiver since the stabilizing compounds absorbs a significant part of the thermal energy used to transfer the dye from the donor to the receiver, thus, decreasing the maximum density of the cyan image in the receiver resulting from cyan dye transfer.

Several types of cyan dyes for dye diffusion thermal transfer materials have been previously described in patents. For example in U.S. Pat. No. 4,695,287 a 2-carbamoyl-4-[N-(p-substituted aminoaryl)imino]-1,4-naphthoquinone is described, in U.S. Pat. No. 5,024,990 a mixture of cyan dyes is described, in U.S. Pat. No. 5,134,115 a cyan azamethine dye is described, in U.S. Pat. No. 4,990,484 a mixture of sublimable dyes of specific wavelength and molecular weight is described, in U.S. Pat. No. 5,252,530 a dye carrier layer containing a specific dye is described, and in RE 34,737 a sublimable dye and a binder on a base film is described.

However, none of the prior patent literature addresses the problems of addition of light stabilizing dye compounds in a dye diffusion thermal transfer element.

PROBLEM TO BE SOLVED

There remains a need for improvements in the stability, especially the light stability, of dye diffusion or sublimation thermal transfer dyes.

SUMMARY OF THE INVENTION

The present invention relates to a cyan dye donor element for thermal transfer imaging comprising a support having thereon a dye layer comprising a mixture of at least two cyan dyes dispersed in a polymeric binder, wherein at least one of the at least two cyan dyes is a light stabilizing dye represented by Formula I:

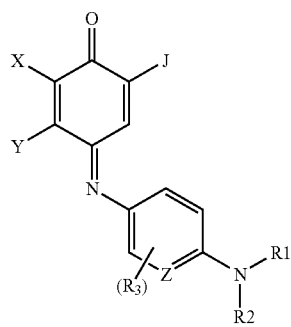

wherein: R1 and R2 are substituted or unsubstituted alkyl, cycloalkyl, or aryl, or combine to form a carbocyclic or heterocyclic ring; R3 is hydrogen, halogen, alkoxy, substituted or unsubstituted alkyl, NHCOR1, NHSO$_2$R1, or combines with either R1 or R2 to form a carbocyclic or heterocyclic ring; X is halogen; Y is alkyl; Z is carbon or nitrogen; J is NHCOR4; R4 is R5Phenyl(OR7)m; R5 is —(CHR6)n- or —(CH$_2$)pO—; R6 is hydrogen, substituted or unsubstituted alkyl; R7 is substituted or unsubstituted alkyl, carbocycle or heterocycle; m is 2-5; n is 0-6; p is 2-5; the formula weight of R4 does not exceed 230 and a thermal image recording method comprising:
  a. providing a cyan dye donor element for thermal dye diffusion or sublimation transfer comprising a support having thereon a dye layer comprising a mixture of at least two cyan dyes dispersed in a polymeric binder, wherein at least one of the at least two cyan dyes is a light stabilizing dye represented by Formula I:

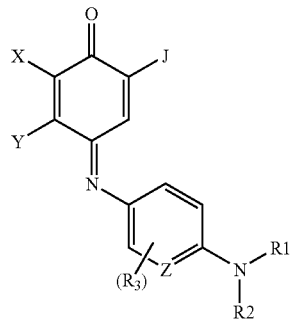

wherein: R1 and R2 are substituted or unsubstituted alkyl, cycloalkyl, or aryl, or combine to form a carbocyclic or heterocyclic ring; R3 is hydrogen, halogen, alkoxy, substituted or unsubstituted alkyl, NHCOR1, NHSO$_2$R1, or combines with either R1 or R2 to form a carbocyclic or heterocyclic ring; X is halogen; Y is alkyl; Z is carbon or nitrogen; J is NHCOR4; R4 is R5Phenyl(OR7)m; R5 is —(CHR6)n- or —(CH$_2$)pO—; R6 is hydrogen, substituted or unsubstituted alkyl; R7 is substituted or unsubstituted alkyl, carbocycle or heterocycle; m is 2-5; n is 0-6; p is 2-5; and the formula weight of R4 does not exceed 230;

b. superimposing the cyan dye donor element on a dye receiving layer face of an image receiving sheet; and c. imagewise heating the cyan dye donor element to transfer the dye from the cyan dye donor element to the image receiving sheet. The present invention also relates to a cyan inkjet dye comprising a light stabilizing cyan dye represented by Formula I:

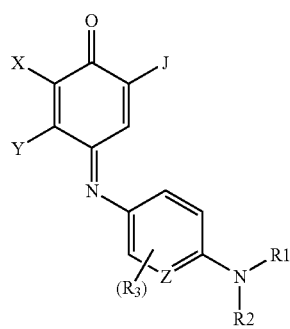

wherein: R1 and R2 are substituted or unsubstituted alkyl, cycloalkyl, or aryl, or combine to form a carbocyclic or heterocyclic ring; R3 is hydrogen, halogen, alkoxy, substituted or unsubstituted alkyl, NHCOR1, NHSO$_2$R1, or combines with either R1 or R2 to form a carbocyclic or heterocyclic ring; X is halogen; Y is alkyl; Z is carbon or nitrogen; J is NHCOR4; R4 is R5Phenyl(OR7)m; R5 is —(CHR6)n- or —(CH$_2$)pO—; R6 is hydrogen, substituted or unsubstituted alkyl; R7 is substituted or unsubstituted alkyl, carbocycle, or heterocycle; m is 2-5; n is 0-6; p is 2-5; and wherein the dye is at least one dye for use in an inkjet color hard copy system.

ADVANTAGEOUS EFFECT OF THE INVENTION

The present invention includes several advantages, not all of which are incorporated in a single embodiment. The new dyes, according to the present invention, combine stabilizing functional groups with dye chromophore to improve light stability and good dye transfer efficiency.

DETAILED DESCRIPTION OF THE INVENTION

The present invention relates to a cyan dye having the formula I:

Formula 1

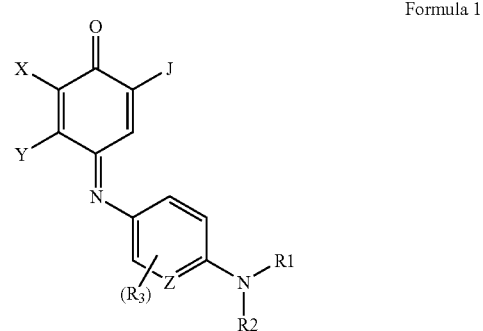

wherein R1 and R2 are substituted or unsubstituted alkyl, cycloalkyl, or aryl, or may be combined to form a carbocyclic or heterocyclic ring; R3 is hydrogen, halogen, alkoxy, substituted or unsubstituted alkyl, NHCOR1, NHSO$_2$R1, or may be combined with either R1 or R2 to form a carbocyclic or heterocyclic ring; X is halogen; Y is alkyl; Z is carbon or nitrogen; J is NHCOR4; R4 is R5Phenyl(OR7)m; R5 is —(CHR6)n- or —(CH$_2$)pO—; R6 is hydrogen, substituted or unsubstituted alkyl, carbocycle, or heterocycle; R7 is substituted or unsubstituted alkyl; m is 2-5, n is 0-6; p is 2-5; and the formula weight of R4 does not exceed 230, and the formula weight of the cyan dye does not exceed 600. The present invention also relates to the use of this cyan dye in a cyan dye donor element for thermal dye transfer comprising a support having thereon a dye layer comprising a mixture of 2 or more cyan dyes dispersed in a polymeric binder, and at least one of the cyan dyes having the formula I.

By combining the molecular structure of a cyan dye with a stabilizing material functional group, the stability of the cyan image in a thermal dye receiver can be improved without loss of cyan density. In this way, cyan dye stability in dye diffusion thermal transfer prints may be improved without the addition of separate stabilizing compounds. To achieve high light stability and still maintain good cyan dye transfer efficiency, it is necessary that the cyan dye structure contain a limited set of functional groups. The total formula weight of the cyan dye can not exceed 600, and the combined formula weight of the alkoxyaryl stabilizing functional group of the dye can not exceeding 230. This can be achieved by limiting the type of alkoxyaryl stabilizing substituent on cyan thermal transfer dyes. This is much different than the molecular functionality of a stabilizing compound added separately to a dye donor material as described in the previous patent literature, e.g.: compound 6 of U.S. Pat. No. 4,855,281, incorporated herein by reference, comprising 22 carbon units of alkoxy substitution. An alkoxyaryl substituent attached to a cyan donor dye comprising 22 carbon units, e.g.: formula weight >250, would greatly decrease the dye donor transfer efficiency. Thus, the alkoxy stabilizing functional groups must be limited to allow high cyan dye transfer efficiency.

The dyes of the present invention contain alkoxyaryl groups on cyan dye diffusion thermal transfer dyes. These have not been disclosed in the prior published patent literature. Such compounds provide thermal dye transfer images with high cyan density and excellent light stability.

The cyan dyes of the invention may be present in any concentration which is effective for the intended purpose. Generally, good results have been obtained in an amount of from 0.05 g/m$^2$ to 1 g/m$^2$ of coverage of the dye in the donor element. In particular molar concentrations of a cyan patch dye amount can be between 40 wt. % and 90 wt. % dye relative to the total dry weight of all components in the layer, for example, and between 55 wt. % and 75 wt. % have been found to be preferred.

Specific cyan dye compounds included within the scope of this invention are as follows:

TABLE 1

| Invention | Structure Formula Weight, | m, n, p | Formula Weight R4 |
|---|---|---|---|
| CD-1 | 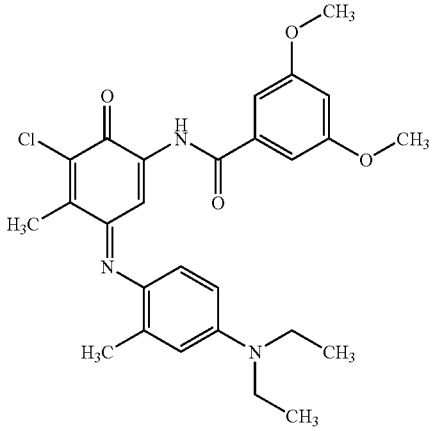<br>FW495 | m = 2<br>n = 0 | 137 |
| CD-2 | 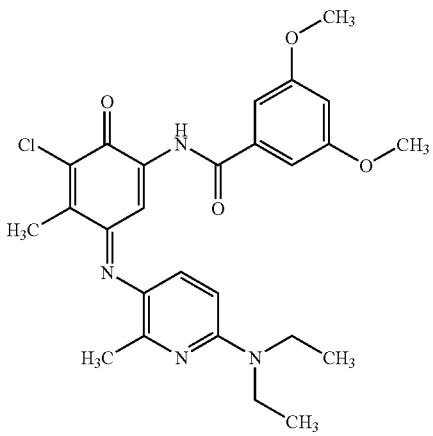<br>FW496 | m = 2<br>n = 0 | 137 |

TABLE 1-continued

| Invention | Structure Formula Weight, | m, n, p | Formula Weight R4 |
|---|---|---|---|
| CD-3 | FW453 | m = 2<br>n = 0 | 137 |
| CD-4 | FW538 | m = 2<br>n = 0 | 137 |
| CD-5 | FW495 | m = 2<br>n = 0 | 137 |

TABLE 1-continued

| Invention | Structure Formula Weight, | m, n, p | Formula Weight R4 |
|---|---|---|---|
| CD-6 | *(structure shown)* FW496 | m = 2<br>n = 0 | 137 |
| CD-7 | *(structure shown)* FW453 | m = 2<br>n = 0 | 137 |
| CD-8 | *(structure shown)* FW538 | m = 2<br>n = 0 | 137 |

TABLE 1-continued

| Invention | Structure Formula Weight, | m, n, p | Formula Weight R4 |
|---|---|---|---|
| CD-9 | FW523 | m = 2<br>n = 0 | 165 |
| CD-10 | FW524 | m = 2<br>n = 0 | 165 |
| CD-11 | FW481 | m = 2<br>n = 0 | 165 |

TABLE 1-continued

| Invention | Structure Formula Weight, | m, n, p | Formula Weight R4 |
|---|---|---|---|
| CD-12 | FW566 | m = 2<br>n = 0 | 165 |
| CD-13 | FW523 | m = 2<br>n = 0 | 165 |
| CD-14 | FW524 | m = 2<br>n = 0 | 165 |

TABLE 1-continued

| Invention | Structure Formula Weight, | m, n, p | Formula Weight R4 |
|---|---|---|---|
| CD-15 | FW481 | m = 2<br>n = 0 | 165 |
| CD-16 | FW566 | m = 2<br>n = 0 | 165 |
| CD-17 | FW525 | m = 3<br>n = 0 | 167 |

TABLE 1-continued

| Invention | Structure Formula Weight, | m, n, p | Formula Weight R4 |
|---|---|---|---|
| CD-18 | FW526 | m = 3<br>n = 0 | 167 |
| CD-19 | FW483 | m = 3<br>n = 0 | 167 |
| CD-20 | FW568 | m = 3<br>n = 0 | 167 |

TABLE 1-continued

| Invention | Structure Formula Weight, | m, n, p | Formula Weight R4 |
|---|---|---|---|
| CD-21 | FW525 | m = 3<br>n = 0 | 167 |
| CD-22 | FW526 | m = 3<br>n = 0 | 167 |
| CD-23 | FW568 | m = 3<br>n = 0 | 167 |

TABLE 1-continued

| Invention | Structure Formula Weight, | m, n, p | Formula Weight R4 |
|---|---|---|---|
| CD-24 | FW493 | m = 2<br>n = 0 | 135 |
| CD-25 | FW555 | m = 4<br>n = 0 | 197 |
| CD-26 | FW539 | m = 3<br>n = 1 | 181 |

TABLE 1-continued

| Invention | Structure Formula Weight, | m, n, p | Formula Weight R4 |
|---|---|---|---|
| CD-27 | FW567 | m = 3<br>n = 2 | 195 |
| CD-28 | FW539 | m = 2<br>p = 2 | 181 |

Any dye transferable by heat can be used in the dye-donor layer of the dye-donor element. The dye can be selected by taking into consideration hue, lightfastness, and solubility of the dye in the dye donor layer binder and the dye image receiving layer binder.

TABLE 2

Yellow Dyes

Y-1
CAS RN 116423-45-1
MW = 400.52
λ max 459 nm

TABLE 2-continued

Y-2
CAS RN 125888-49-5
MW 362.47
λ max 447 nm

TABLE 2-continued
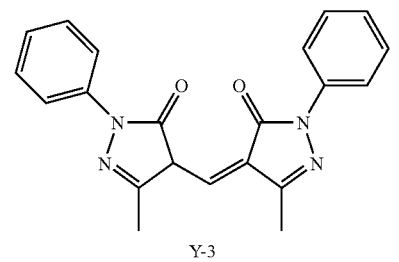
Y-3
CAS RN 4174-09-8
MW = 358.34
λ max 418 nm
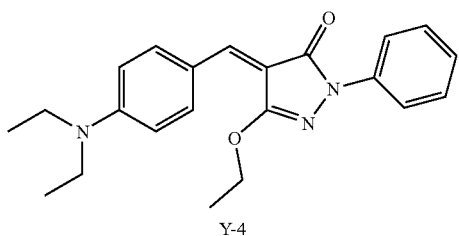
Y-4
CAS RN 474044-10-5
MW = 363.43
λ max 457 nm
Magenta Dyes
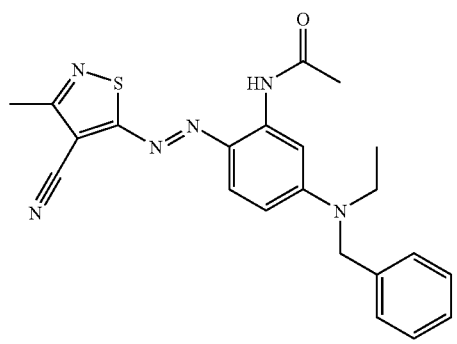
M-1
CAS RN 112940-69-9
MW 418.52
λ max 544 nm
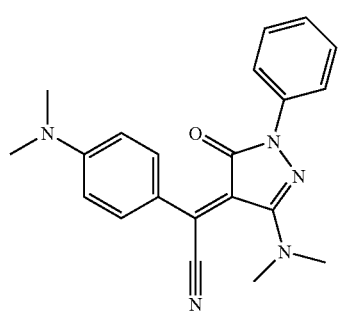
M-2
CAS RN 124621-37-0
MW 359.43
λ max 522 nm
TABLE 2-continued
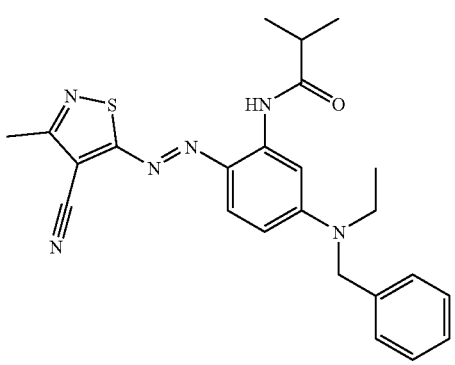
M-3
CAS RN 186030-51-3
MW 446.57
λ max 544 nm
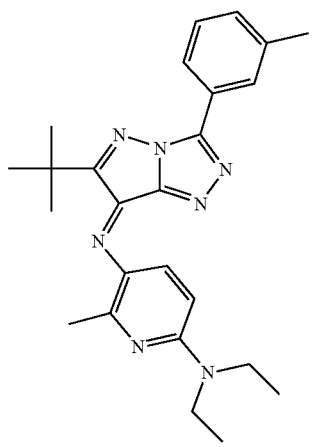
M-4
CAS RN 162208-01-7
MW = 429
λ max 535 nm
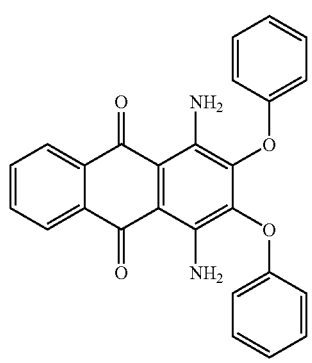
M-5
CAS RN 6408-72-6
MW 422
λ max 544 nm

TABLE 2-continued

Cyan Dyes

C-1
CAS RN 4899-82-5
MW 361.44
λ max 658 nm

C-2
CAS RN 102187-53-1
MW 375.47
λ max 677 nm

C-3
CAS RN 161358-44-7
MW 375.47
λ max 657 nm

TABLE 2-continued

C-4
CAS RN 102387-48-4
MW = 373.86
λ max 669 nm

C-5
CAS RN 129604-78-0
MW = 435.92
λ max 679 nm

C-6
CAS RN 105296-07-9
MW = 339.41
λ max 645 nm

Examples of sublimable or diffusible dyes include anthraquinone dyes, e.g., Sumikalon Violet RS® (Sumitomo Chemical Co., Ltd.), Dianix Fast Violet 3R F® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR®) (Nippon Kayaku Co., Ltd.), Sumickaron Diazo Black 5G® (Sumitomo Chemical Co., Ltd.), and Miktazol Black 5 GH® (Mitsui Toatsu Chemicals, Inc.); direct dyes such as Direct Dark Green B® (Mitsubishi Chemical Industries, Ltd.) and Direct Brown M® and Direct Fast Black D® (Nippon Kayaku Co. Ltd.); acid dyes such as Kayanol Milling Cyanine 5R® (Nippon Kayaku Co. Ltd.); basic dyes such as Sumicacryl Blue 6G® (Sumitomo Chemical Co., Ltd.), and Aizen Malachite Green® (Hodogaya Chemical Co., Ltd.); or any of the dyes disclosed in U.S. Pat. No. 4,541,830, the disclosure of which is hereby incorporated by reference.

Examples of further suitable dyes, including further magenta, yellow, and cyan dyes, can include, but are not limited to, diarylmethane dyes; triarylmethane dyes; thiazole dyes, such as 5-arylisothiazole azo dyes; methine dyes such as merocyanine dyes, for example, aminopyrazolone merocyanine dyes; azomethine dyes such as indoaniline, acetophenoneazomethine, pyrazoloazomethine, imidazoleazomethine, imidazoazomethine, pyridoneazomethine, and tricyanopropene azomethine dyes; xanthene dyes; oxazine dyes; cyanomethylene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrraleazo, imidazoleazo, thiadiazoleazo, triazoleazo, and disazo dyes; arylidene dyes such as alpha-cyano arylidene pyrazolone and aminopyrazolone arylidene dyes; spiropyran dyes; indolinospiropyran dyes; fluoran dyes; rhodaminelactam dyes; naphthoquinone dyes, such as 2-carbamoyl-4-[N-(p-substituted aminoaryl)imino]-1,4-naphthaquinone; anthraquinone dyes; and quinophthalone dyes. Specific examples of dyes usable herein can include:

C.I. (color index) Disperse Yellow 51, 3, 54, 79, 60, 23, 7, and 141;

C.I. Disperse Blue 24, 56, 14, 301, 334, 165, 19, 72, 87, 287, 154, 26, and 354;

C.I. Disperse Red 135, 146, 59, 1, 73, 60, and 167;

C.I. Disperse Orange 149;

C.I. Disperse Violet 4, 13, 26, 36, 56, and 31;

C.I. Disperse Yellow 56, 14, 16, 29, and 231;

C.I. Solvent Blue 70, 35, 36, 50, 49, 111, 105, 97, and 11;

C.I. Solvent Red 135, 81, 18, 25, 19, 23, 24, 143, 146, and 182;

C.I. Solvent Violet 13;

C.I. Solvent Black 3; and

C.I. Solvent Green 3.

Other suitable cyan dyes can include Kayaset Blue 714 (Solvent Blue 63, manufactured by Nippon Kayaku Co., Ltd.), Phorone Brilliant Blue S-R (Disperse Blue 354, manufactured by Sandoz K.K.), and cyan dyes of the structures.

Other suitable yellow dyes can include Phorone Brilliant Yellow S-6 GL (Disperse Yellow 231, manufactured by Sandoz K.K.) and Macrolex Yellow 6G (Disperse Yellow 201, manufactured by Bayer).

Further examples of useful dyes can be found in U.S. Pat. Nos. 4,541,830; 4,698,651; 4,695,287; 4,701,439; 4,757,046; 4,743,582; 4,769,360; 4,753,922; 4,910,187; 5,026,677; 5,101,035; 5,142,089; 5,374,601; 5,476,943; 5,532,202; 5,804,531; 6,265,345, and U.S. Patent Application Publication No. US 2003/0181331, the disclosures of which are hereby incorporated by reference.

The dyes can be employed singly or in combination to obtain a monochrome dye-donor layer or a black dye-donor layer. The dyes can be used in an amount of from 0.05 $g/m^2$ to 1 $g/m^2$ of coverage. According to various embodiments, the dyes can be hydrophobic.

Each dye-donor layer patch can range from 20 wt. % to 90 wt. % dye, relative to the total dry weight of all components in the layer. A high amount of dye is desirable for increased efficiency, but higher amounts of dye can lead to increased occurrences of donor/receiver sticking. Depending on the efficiency of the dye-donor layer, a lower amount of dye can be used to achieve the same efficiency as a different dye-donor layer. The dye percent is ideally chosen in view of the specific donor and receiver combination.

Varying the amount of dye in the donor can aid in matching the efficiency between different dye patches, for example, a cyan, magenta, and yellow patch. For example, yellow and/or magenta patch dye amounts can be between 20 wt. % and 75 wt. % dye relative to the total dry weight of all components in the layer, for example, between 30 wt. % and 50 wt. %. A cyan patch dye amount can be between 40 wt. % and 90 wt. % dye relative to the total dry weight of all components in the layer, for example, between 55 wt. % and 75 wt. %.

To form each color patch of a dye-donor layer, one or more dyes can be dispersed in a polymeric binder. The binder can be used in an amount of from 0.05 $g/m^2$ to 5 $g/m^2$. The polymeric binder can be, for example, a polycarbonate; a poly(styrene-co-acrylonitrile); a poly(sulfone); a poly(phenylene oxide); a polyvinyl butyral; a polyvinyl acetal; a cellulose derivative such as, but not limited to, ethyl cellulose, cellulose acetate hydrogen phthalate, cellulose acetate, cellulose acetate propionate, cellulose acetate butyrate, or cellulose triacetate; or a combination thereof.

The dye-donor layer can have a dye to binder ratio for each color dye patch. For example, a yellow dye to binder ratio can be from 0.3 to 2.0, or from 0.5 to 1.75. A magenta dye to binder ratio can be from 0.5 to 2.0, or from 0.8 to 1.8. A cyan dye to binder ratio can be form 1.0 to 3.0, or from 1.5 to 2.75.

The dye-donor layer can have a dye to binder ratio for each color dye patch. For example, a yellow dye to binder ratio can be from 0.3 to 1.2, or from 0.5 to 1.0. A magenta dye to binder ratio can be from 0.5 to 1.5, or from 0.8 to 1.2. A cyan dye to binder ratio can be from 1.0 to 2.5, or from 1.5 to 2.0.

The dye-donor layer of the dye-donor element can be formed or coated on a support. The dye-donor layer composition can be dissolved in a solvent for coating purposes. The dye-donor layer can be formed or coated on the support by techniques such as, but not limited to, a gravure process, spin-coating, solvent-coating, extrusion coating, or other methods known to practitioners in the art.

The support can be formed of any material capable of withstanding the heat of thermal printing. According to various embodiments, the support can be dimensionally stable during printing. Suitable materials can include polyesters, for example, poly(ethylene terephthalate) and poly(ethylene naphthalate); polyamides; polycarbonates; glassine paper; condenser paper; cellulose esters, for example, cellulose acetate; fluorine polymers, for example, poly(vinylidene fluoride) and poly(tetrafluoroethylene-co-hexafluoropropylene); polyethers, for example, polyoxymethylene; polyacetals; polystyrenes; polyolefins, for example, polyethylene, polypropylene, and methylpentane polymers; polyimides, for example, polyimide-amides and polyether-imides; and combinations thereof. The support can have a thickness of from 1 μm to 30 μm, for example, from 3 μm to 7 μm.

According to various embodiments, a subbing layer, for example, an adhesive or tie layer, a dye-barrier layer, or a combination thereof, can be coated between the support and the dye-donor layer. The subbing layer can be one or more layers. The adhesive or tie layer can adhere the dye-donor layer to the support. Suitable adhesives are known to practitioners in the art, for example, Tyzor TBT® from E.I. DuPont de Nemours and Company. The dye-barrier layer can include a hydrophilic polymer. The dye-barrier layer can provide improved dye transfer densities.

The dye-donor element can include a slip layer to reduce or prevent print head sticking to the dye-donor element. The slip layer can be coated on a side of the support opposite the dye-donor layer. The slip layer can include a lubricating material, for example, a surface-active agent, a liquid lubricant, a solid lubricant, or mixtures thereof, with or without a polymeric binder. Suitable lubricating materials can include oils or semi-crystalline organic solids that melt below 100° C., for example, poly(vinyl stearate), beeswax, perfluorinated alkyl ester polyether, poly(caprolactone), carbowax, polyethylene homopolymer, or poly(ethylene glycol). The lubricating material can also be a silicone- or siloxane-containing polymer. Suitable polymers can include graft copolymers, block polymers, copolymers, and polymer blends or mixtures. Suitable polymeric binders for the slip layer can include poly(vinyl alcohol-co-vinylbutyral), poly(vinyl alcohol-co-vinylacetal), polystyrene, poly(vinyl acetate), cellulose acetate butyrate, cellulose acetate, ethyl cellulose, and other binders as known to practitioners in the art. Preferably, the slipping layer formulation most desired for resistive head thermal media incorporates a synergistic combination of lubricants from a friction perspective and in terms of head-wear or print head buildup. The preferred slip layer is disclosed in U.S. Pat. No. 7,078,366, incorporated herein by reference. The amount of lubricating material used in the slip layer is dependent, at least in part, upon the type of lubricating material, but can be in the range of from 0.001 to 2 g/m$^2$, although less or more lubricating material can be used as needed. If a polymeric binder is used, the lubricating material can be present in a range of 0.1 to 50 weight %, preferably 0.5 to 40 weight %, of the polymeric binder.

The dye-donor element can include a stick preventative agent to reduce or eliminate sticking between the dye-donor element and the receiver element during printing. The stick preventative agent can be present in any layer of the dye-donor element, so long as the stick preventative agent is capable of diffusing through the layers of the dye-donor element to the dye-donor layer, or transferring from the slip layer to the dye-donor layer. For example, the stick preventative agent can be present in one or more patches of the dye-donor layer, in the support, in an adhesive layer, in a dye-barrier layer, in a slip layer, or in a combination thereof. According to various embodiments, the stick preventative agent can be in the slip layer, the dye-donor layer, or both. According to various embodiments, the stick preventative agent is in the dye-donor layer. The stick preventative agent can be in one or more colored patches of the dye-donor layer, or a combination thereof. If more than one dye patch is present in the dye-donor layer, the stick preventative agent can be present in the last patch of the dye-donor layer to be printed, typically the cyan layer. However, the dye patches can be in any order. For example, if repeating patches of cyan, magenta, and yellow are used in the dye-donor element, in that respective order, the yellow patches, as the last patches printed in each series, can include the stick preventative agent. The stick preventative agent can be a silicone- or siloxane-containing polymer. Suitable polymers can include graft copolymers, block polymers, copolymers, and polymer blends or mixtures. Suitable stick preventative agents are described, for example, in U.S. Pat. No. 7,067,457.

Optionally, release agents as known to practitioners in the art can also be added to the dye-donor element, for example, to the dye-donor layer, the slip layer, or both. Suitable release agents can include, for example, those described in U.S. Pat. Nos. 4,740,496 and 5,763,358.

According to various embodiments, the dye-donor layer may or may not contain plasticizer. However, inclusion of the plasticizer in the dye-donor layer can increase dye-donor efficiency. Useful plasticizers may include those known in the art, such as those described in U.S. Pat. Nos. 5,830,824 and 5,750,465, incorporated herein by reference, and references disclosed therein. Suitable plasticizers can be defined as compounds having a glass transition temperature (Tg) less than 25° C., a melting point (Tm) less than 25° C., or both. Plasticizers useful for this invention can include low molecular weight plasticizers and higher molecular weight plasticizers such as oligomeric or polymeric plasticizers. Examples of suitable plasticizers can include aliphatic polyesters, epoxidized oils, chlorinated hydrocarbons, poly(ethylene glycols), poly(propylene glycols), and poly(vinyl ethyl ether) (PVEE). The molecular weight of the plasticizer can be greater than or equal to 450 to minimize transfer of the plasticizer to the dye-receiving layer during printing. The plasticizer can be present in an amount of from 1 to 50%, for example, from 5% to 35%, by weight of the binder.

Aliphatic polyesters suitable as plasticizers can be derived from succinic acid, glutaric acid, adipic acid, pimelic acid, suberic acid, azelaic acid, and sebacic acid. The aliphatic polyesters can have one or more functional end groups, for example a carboxyl, hydroxyl, or alkoxyl group, where each alkoxyl group can be from 1 to 18 carbon atoms. Examples of suitable aliphatic polyesters can include Drapex plasticizers (Crompton/Witco Corporation, Middlebury, Conn., USA), such as Drapex 429, and Admex plasticizers (Velsicol Chemical Corporation, Rosemont, Ill., USA) such as Admex 429, and Paraplex® G25, Plasthall® HA7A, Plasthall® P650, Plasthall® P-7092, all from CP Hall Company, Chicago, Ill., USA.

Epoxidized oils suitable as plasticizers can include partially or completely epoxidized natural oils, and partially or completely epoxidized derivatized natural oils such as epoxidized soybean oil sold as Paraplex® G-60, Paraplex® G-62, and Plasthall® ESO; epoxidized linseed oil sold as Plasthall® ELO; or epoxidized octyl tallate sold as Plasthall® S-73, all from C. P. Hall Company.

Chlorinated hydrocarbons suitable for use as plasticizers can include long-chain hydrocarbons or paraffins consisting of methylene, methyl, methane or alkene groups, all of which can have a chlorine substitution. The length of the long-chain hydrocarbon can be between 8 and 30 carbon atoms, for example, between 12 and 24 carbon atoms. The chains can be branched. The amount of chlorine in the paraffin can be between 25 and 75 wt %, for example, between 40 and 70 wt %. Mixtures of chlorinated paraffins can also be used. According to certain embodiments, the chlorinated paraffins can have the formula $C_xH_yC_z$ wherein x is between 11 and 24, y is between 14 and 43, and z is between 3 and 10. Examples of suitable chlorinated hydrocarbons can include Chlorowax liquids sold by Occidental Chemical Corp., Dallas, Tex., USA, and Paroil paraffins sold by Dover Chemical Corp., Dover, Ohio, USA, such as Chlorowax 40 and Paroil 170HV.

Poly(ethylene glycols) and poly(propylene glycols) suitable for use as plasticizers can have unsubstituted end groups (OH), or they can be substituted with one or more functional groups such as an alkoxyl group or fatty acid, where each alkoxyl group or fatty acid can be from 1 to 18 carbon atoms. Examples of suitable poly(ethylene glycols) and poly(propylene glycols) can include TegMer 809 poly(ethylene glycol) from C. P. Hall Co., and PPG #483 poly(propylene glycol) from Scientific Polymer Products, Ontario, N.Y., USA.

The dye-donor layer can include beads. The beads can have a particle size of from 0.5 to 20 microns, preferably from 2.0 to 15 microns. The beads can act as spacer beads under the compression force of a wound up dye-donor roll, improving raw stock keeping of the dye-donor roll by reducing the material transferred from the dye-donor layer to the slipping layer, as measured by the change in sensitometry under accelerated aging conditions, or the appearance of unwanted dye in the laminate layer, or from the backside of the dye-donor element, for example, a slipping layer, to the dye-donor layer. The use of the beads can result in reduced mottle and improved image quality. The beads can be employed in any amount effective for the intended purpose. In general, good results have been obtained at a coverage of from 0.003 to 0.20 $g/m^2$. Beads suitable for the dye-donor layer can also be used in the slip layer.

The beads in the dye-donor layer can be crosslinked, elastomeric beads. The beads can have a glass transition temperature (Tg) of 45° C. or less, for example, 10° C. or less. The elastomeric beads can be made from an acrylic polymer or copolymer, such as butyl-, ethyl-, propyl-, hexyl-, 2-ethylhexyl-, 2-chloroethyl-, 4-chlorobutyl- or 2-ethoxyethyl-acrylate or methacrylate; acrylic acid; methacrylic acid; hydroxyethyl acrylate; a styrenic copolymer, such as styrene-butadiene, styrene-acrylonitrile-butadiene, styrene-isoprene, or hydrogenated styrene-butadiene; or mixtures thereof. The elastomeric beads can be crosslinked with various crosslinking agents, which can be part of the elastomeric copolymer, such as but not limited to divinylbenzene; ethylene glycol diacrylate; 1,4-cyclohexylene-bis(oxyethyl)dimethacrylate; 1,4-cyclohexylene-bis(oxypropyl)diacrylate; 1,4-cyclohexylene-bis(oxypropyl)dimethacrylate; and ethylene glycol dimethacrylate. The elastomeric beads can have from 1 to 40%, for example, from 5 to 40%, by weight of a crosslinking agent.

The beads in the dye-donor layer can be hard polymeric beads. Suitable beads can include divinylbenzene beads, beads of polystyrene crosslinked with at least 20 wt. % divinylbenzene, and beads of poly(methyl methacrylate) crosslinked with at least 20 wt. % divinylbenzene, ethylene glycol dimethacrylate, 1,4-cyclohexylene-bis(oxyethyl) dimethacrylate, 1,4-cyclohexylene-bis(oxypropyl) dimethacrylate, or other crosslinking monomers known to those familiar with the art.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The receiver element suitable for use with the dye-donor element described herein can be any receiver element as known to practitioners in the art. For example, the receiver element can include a support having thereon a dye image-receiving layer. The support can be a transparent film. Transparent supports include cellulose derivatives, for example, a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly (butylene terephthalate), and copolymers thereof; polyimides; polyamides; polycarbonates; polystyrene; poly(vinyl alcohol-co-vinlyacetal); polyolefins, such as polyethylene or polypropylene; polysulfones; polyacrylates; polyetherimides; and mixtures thereof. Opaque supports can include plain paper, coated paper, synthetic paper, photographic paper support, melt-extrusion-coated paper, and laminated paper, such as biaxially oriented support laminates. Biaxially oriented support laminates suitable for use as receivers are described in U.S. Pat. Nos. 5,853,965; 5,866,282; 5,874,205; 5,888, 643; 5,888,681; 5,888,683; and 5,888,714. Biaxially oriented supports can include a paper base and a biaxially oriented polyolefin sheet, for example, polypropylene, laminated to one or both sides of the paper base. The support can be a reflective paper, for example, baryta-coated paper, white polyester (polyester with white pigment incorporated therein), an ivory paper, a condenser paper, or a synthetic paper, for example, DuPont Tyvek® by E.I. DuPont de Nemours and Company, Wilmington, Del. The support can be employed at any desired thickness, for example, from 10 μm to 1000 μm. Exemplary supports for the dye image-receiving layer are disclosed in commonly assigned U.S. Pat. Nos. 5,244,861 and 5,928,990, and in EP-A-0671281. Other suitable supports as known to practitioners in the art can also be used. According to various embodiments, the support can be a composite or laminate structure comprising a base layer and one or more additional layers. The base layer can comprise more than one material, for example, a combination of one or more of a microvoided layer, a foamed layer, a nonvoided layer, a synthetic paper, a natural paper, and a polymer.

The dye image-receiving layer of the receiver element can be, for example, a polycarbonate, a polyurethane, a polyester, polyvinyl chloride, poly(styrene-co-acrylonitrile), poly(caprolactone), poly(vinyl chloride-co-vinyl acetate), poly(ethylene-co-vinyl acetate), polyvinylacetals such as polyvinylbutyral or polyvinylheptal, polymethacrylates including those described in U.S. Pat. No. 6,361,131, or combinations thereof. The dye image-receiving layer can be coated on the receiver element support in any amount effective for the intended purpose of receiving the dye from the dye-donor layer of the dye-donor element. For example, the dye image-receiving layer can be coated in an amount of from 1 $g/m^2$ to 5 $g/m^2$. Additional polymeric layers can be present between the support and the dye image-receiving layer. The additional layers can provide coloring, adhesion, antistat properties, act as a dye-barrier, act as a dye mordant layer, or a combination thereof. For example, a polyolefin such as polyethylene or polypropylene can be present. White pigments such as titanium dioxide, zinc oxide, and the like can be added to the polymeric layer to provide reflectivity. A subbing layer optionally can be used over the polymeric layer in order to improve adhesion to the dye image-receiving layer. This can be called an adhesive or tie layer. Exemplary subbing layers are disclosed in U.S. Pat. Nos. 4,748,150, 4,965,238, 4,965, 239, and 4,965,241. An antistatic layer as known to practitioners in the art can also be used in the receiver element. The receiver element can also include a backing layer. Suitable examples of backing layers include those disclosed in U.S. Pat. Nos. 5,011,814 and 5,096,875.

The dye image-receiving layer, or an overcoat layer thereon, can contain a release agent, for example, a silicone or fluorine based compound, as is conventional in the art. Various exemplary release agents are disclosed, for example, in U.S. Pat. Nos. 4,820,687 and 4,695,286.

The receiver element can also include stick preventative agents, as described for the donor element. According to various embodiments, the receiver element and dye-donor element can include the same stick preventative agent.

The dye image-receiving layer can be formed on the support by any method known to practitioners in the art, including but not limited to printing, solution coating, dip coating, and extrusion coating. Wherein the dye image-receiving layer is extruded, the process can include (a) forming a melt comprising a thermoplastic material; (b) extruding or coextruding the melt as a single-layer film or a layer of a composite (multilayer or laminate) film; and (c) applying the extruded film to the support for the receiver element.

The present invention relates to a thermal image recording method comprising:

a. providing a cyan dye donor element for thermal dye diffusion or sublimation transfer comprising a support having thereon a dye layer comprising a mixture of at least two cyan dyes dispersed in a polymeric binder, wherein at least one of the at least two cyan dyes is a light stabilizing dye represented by Formula I:

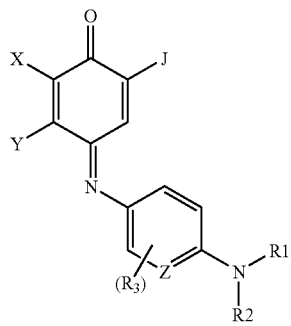

wherein: R1 and R2 are substituted or unsubstituted alkyl, cycloalkyl, or aryl, or combine to form a carbocyclic or heterocyclic ring; R3 is hydrogen, halogen, alkoxy, substituted or unsubstituted alkyl, NHCOR1, NHSO$_2$R1, or combines with either R1 or R2 to form a carbocyclic or heterocyclic ring; X is halogen; Y is alkyl; Z is carbon or nitrogen; J is NHCOR4; R4 is R5Phenyl(OR7)m; R5 is —(CHR6)n- or —(CH$_2$)pO—; R6 is hydrogen, substituted or unsubstituted alkyl; R7 is substituted or unsubstituted alkyl, carbocycle or heterocycle; m is 2-5; n is 0-6; p is 2-5; and the formula weight of R4 does not exceed 230;

b. superimposing the cyan dye donor element on a dye receiving layer face of an image receiving sheet; and c. imagewise heating the cyan dye donor element to transfer the dye from the cyan dye donor element to the image receiving sheet. Most preferably, imagewise heating the cyan dye donor element to transfer the dye from the cyan dye donor element to the image receiving sheet, wherein the polymeric binder does not transfer also. The dye-donor element and receiver element, when placed in superposed relationship such that the dye-donor layer of the dye-donor element is adjacent the dye image-receiving layer of the receiver element, can form a print assembly. An image can be formed by passing the print assembly past a print head, wherein the print head is located on the side of the dye-donor element opposite the receiver element. The print head can apply heat imagewise or patch-wise to the dye-donor element, causing the dyes or laminate in the dye-donor layer to transfer to the dye image-receiving layer of the receiver element.

Thermal print heads that can be used with the print assembly are available commercially and known to practitioners in the art. Exemplary thermal print heads can include, but are not limited to, a Fujitsu Thermal Head (FTP-040 MCSOO1), a TDK Thermal Head F415 HH7-1089, a Rohm Thermal Head KE 2008-F3, a Shinko head (TH300U162P-001), and Toshiba heads (TPH162R1 and TPH207R1A).

A dye composition as described herein can exhibit one or more of improved light fade stability, improved keeping properties, or higher efficiency, providing high quality images of sufficient density and improved lightfastness even at line speed printing of equal or less than one milliseconds. Although inclusion of new stabilized dyes into dye diffusion thermal transfer donor material is the preferred embodiment, the dyes may also be used in other imaging applications, such as, for example, laser sublimation transfer, ink jet color hard copy, and silver halide color paper. In a preferred embodiment, the present invention also relates to a cyan inkjet dye comprising a light stabilizing cyan dye represented by Formula I, wherein the dye is at least one dye for use in an inkjet color hard copy system.

The cyan dye compounds of this invention may be prepared by methods known to those skilled in the art including the reaction of aryldiamines with phenols as shown below. The aryldiamines N,N-dimethylphenylene diamine may be purchased from Alfa Aesar, Ward Hill, Mass., USA, and N4,N4-diethyl-2-methyl-1,4-phenylenediamine hydrochloride may be purchased from Aldrich Chemical Company, Milwaukee, Wis., USA. The aryldiamine N,N-diethyl-6-methyl-2,5-pyridinediamine dihydrochloride may be prepared by methods known to those skilled in the art including the procedure of U.S. Pat. No. 5,753,017, or more efficiently by the procedure described below. The phenols may be prepared by methods know to those skilled in the art including the reaction of 2-amino-4,6-dichloro-5-methylphenol (commercially available from Alfa Aesar, Ward Hill, Mass., USA) and acid chlorides as shown below. The acid chloride materials may be purchased or prepared as described below. The materials 2,3-dimethoxybenzoyl chloride and 3,4-diethoxybenzoyl chloride, and 2,3,4-trimethoxybenzoyl chloride can be purchased from ChemCollect GmBH, Remscheid, Germany. The materials 3,4-dimethoxybenzoyl chloride, 3,5-dimethoxybenzoyl chloride, 3,4,5-trimethoxybenzoyl chloride may be purchased from Aldrich Chemical Company, Milwaukee, Wis., USA. The material 4-isopropoxy-3-methoxybenzoyl chloride may be prepared by one skilled in the art by the reaction of thionyl chloride and 3-methoxy-4-(1-methylethoxy)benzoic acid commercially available from ChemBridge Building Block Library, San Diego Calif. USA. The material 3,4,5-trimethoxyphenylacetyl chloride may be prepared by the procedure reported in Chemische Berichte (1959), 92 pp. 1336-45. The material 3-(3,4,5-trimethoxyphenyl)proprionyl chloride may be prepared by the procedure reported in Synthetic Communications (1988), 18(7), 699-710. The material 4-(3,4,5-trimethoxyphenyl)butyryl chloride may be prepared by one skilled in the art by the reaction of thionyl chloride and 4-(3,4,5-trimethoxyphenyl)butyric acid which can be prepared by the procedure reported in Tetrahedron (1985), 41(14), 2933-8. The material 3-(2,4-dimethoxyphenoxy)proprionyl chloride may be prepared by one skilled in the art by the reaction of oxalyl chloride and 3-(2,4-dimethoxyphenoxy)proprionic acid which can be prepared by the procedure reported in Compt. Rend. (1952), 234 444-6.

The following examples are provided to illustrate the invention.

EXAMPLES

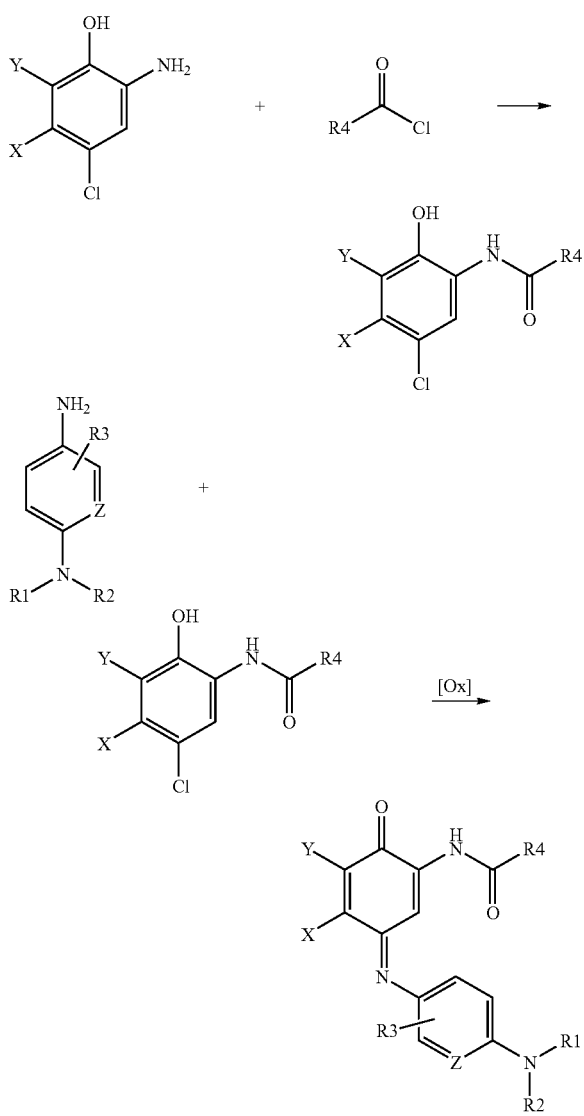

Example 1

Preparation of N-(3,5-dichloro-2-hydroxy-4-methylphenyl)-3,5-dimethoxybenzamide

Into a 500 ml 3-necked round bottom flask, equipped with a stir bar, addition funnel, and $N_2$ inlet, was placed 10 g (52 mmoles) of 6-amino-2,4-dichloro-3-methylphenol and 150 ml of ethyl acetate. With stirring a solution resulted. To this solution was added 4.53 g (57.2 mmoles) of pyridine. This solution was stirred for 5 minutes during which time 10.95 g (54.6 mmoles) of 3,5-dimethoxybenzoyl chloride (Aldrich Chemical Co., CAS RN 17213-57-9) was dissolved in 75 ml of ethyl acetate and placed in an addition funnel. This solution was added dropwise to the reaction vessel over a 30 minute period. A precipitate formed almost immediately. After complete addition the reaction mixture was allowed to stir overnight. Thin layer chromatography (5/95 acetone/$CH_2Cl_2$) analysis of the reaction mixture indicated no starting material and primarily one new spot and a spot at the origin. The reaction mixture was poured into a separatory funnel and washed 2 times with a cold 10% hydrochloric acid solution followed by 2 times with a saturated sodium chloride solution and the organic layer was dried over sodium sulfate. The sodium sulfate was collected on a gravity filter and the filtrate was concentrated to a salmon colored solid. This solid was recrystallized from refluxing ethanol. The resulting crystals were collected on a medium sintered glass funnel, and dried by sucking air through for three hours. 8.9 g of desired product was obtained, a 48% purified yield.

Preparation of Cyan Dye CD-1

Into a 250 ml erlenmeyer flask, equipped with a stir bar, was placed 4 g (11.4 mmoles) of N-(3,5-dichloro-2-hydroxy-4-methylphenyl)-3,5-dimethoxybenzamide, 2.68 g (12.5 mmoles) N4,N4-diethyl-2-methyl-1,4-benzenediamine monohydrochloride and 100 ml of methanol. A suspension resulted. To this suspension was added 7.84 g (77.5 mmoles) of triethylamine. This mixture mostly became homogeneous, a slight filmy residue remained. The reaction flask was cooled via an ice/water bath to about 5° C. While the reaction mixture was cooling 5.7 g (25 mmoles) of ammonium persulfate was dissolved in 12 mL of water. This solution was added dropwise to the reaction vessel. The mixture got so thick during the addition that an additional 100 ml of methanol needed to be added. After complete addition of the ammonium persulfate the mixture was stirred at 5° C. for 2½ hours. The resulting solid was collected on a medium sintered glass funnel, rinsed with methanol then 2 times with 45° C. water and finally ligroin and then air dried by sucking air through the funnel overnight 4 g of desired product was collected. The collected product was returned to a 125 ml erlenmeyer flask and 75 ml of ethanol was added and the mixture was heated to reflux on a hot plate for 5 minutes. The mixture was allowed to cool to 45° C. and the solid was then collected on a medium sintered glass funnel and dried by sucking air through the funnel overnight. The yield was 3.39 g (60% purified yield) of desired dye, with an absorbance maximum of 680 nm in methanol, and an extinction coefficient of 32,284.

Example 2

Preparation of 6-diethylamino-3-nitro-2-picoline

Into a 500 mL flask was placed 11.2 gram (65 mmol) of 6-chloro-3-nitro-2-picoline (Acros Organics, Belgium) and 100 mL (70 grams, 0.96 mol) of diethylamine (d=0.70 g/mL, b.p.=55° C.). The mixture was stirred at room temperature for a few minutes to fully dissolve the chloronitropicoline, then the homogenous solution was placed in an pre-heated oil bath at 70° C. Upon reaching reflux the reaction takes on a yellow color and within 30 minutes a white precipitate of diethylammonium hydrochloride began to form. The reaction was refluxed overnight. After this time, high pressure liquid chromatography analysis indicated complete consumption of starting material and the formation of one new product. The reaction was cooled to room temperature, poured into 500 mL of cold water, and chilled in an ice/ethanol bath with stirring for 3 hours. The solid product was collected on a Buchner funnel, dried by sucking air through for 2 hrs then under high vacuum overnight. 13.2 grams (63 mmoles, 97% yield) of product 6-diethylamino-3-nitro-2-picoline, with a m.p. of 36-38° C., was collected.

Preparation of N2,N2-diethyl-6-methyl-2,5-pyridinediamine dihydrochloride

Into a 500 mL PARR reactor bottle was placed 6.3 gram (30 mmol) of 6-diethylamino-3-nitro-2-picoline and 75 mL of reagent grade methanol. The mixture was stirred at room temperature for a few minutes to fully dissolve the diethylaminonitropicoline, then 1 gram of 5% Palladium on carbon was added. The resulting mixture was placed upon the PARR hydrogenation shaker and hydrogenated at 50 psi $H_2$ atmosphere at room temperature. After 3 hours the reaction was removed from the hydrogenation shaker and evaluated by thin layer chromatography to show that all starting material had been consumed and one product had formed. The product containing methanol solution was filtered through a pad of Supercel Celite slurried in methanol on a medium porosity sintered glass funnel to remove the palladium on carbon catalyst. The Celite pad was washed with 25 mL of methanol. The resulting nearly colorless filtrate was treated with 7 mL of concentrated hydrochloric acid (0.84 moles hydrogen chloride) and the lightly colored solution was transferred to a 500 mL flask. The product mixture was concentrated under reduced pressure at 50° C. to afford a wet amorphous semi-solid product mixture. This was treated with 50 mL of acetonitrile and stirred rapidly for 45 minutes then filtered on a Buchner funnel. The resulting off-white solid was washed with 25 mL of acetonitrile, dried by sucking air through for 30 minutes, then dried under high vacuum over night. The off-white product of N2,N2-diethyl-6-methyl-2,5-pyridinediamine dihydrochloride was 7.2 grams (28.5 mmol, 95.1% yield). Mass Spectrum analysis indicated an Electron Impact EI+ m/e of 179.

Preparation of Cyan Dye CD-2

Into a 250 ml erlenmeyer flask was placed 4 g (11.4 mmoles) of N-(3,5-dichloro-2-hydroxy-4-methylphenyl)-3,5-dimethoxybenzamide, 3.15 g (12.5 mmoles) N2,N2-diethyl-6-methyl-2,5-pyridinediamine dihydrochloride and 100 ml of methanol. A suspension resulted. To this suspension was added 7.84 g (77.5 mmoles) of triethylamine. The suspension became a solution. The reaction flask was cooled via an ice/water bath to about 5° C. While the reaction mixture was cooling, 5.7 g (25 mmoles) of ammonium persulfate was dissolved in 12 mL of water. This solution was added dropwise to the reaction vessel. The mixture got so thick during the addition that an additional 100 ml of methanol needed to be added. After complete addition of the ammonium persulfate, the mixture was stirred at 5° C. for 2½ hours. The solid was collected on a medium sintered glass funnel, rinsed with methanol then 2 times with 45° C. water and finally ligroin and then air dried by sucking air through the funnel overnight. 5.2 g of desired product was collected. The collected product was returned to a 125 ml erlenmeyer flask 75 ml of ethanol was added. The mixture was heated to reflux on a hot plate for 5 minutes and allowed to cool to 45° C. A solid was then collected on a medium sintered glass funnel and dried by sucking air through the funnel overnight. The yield was 4.8 g (85% purified yield) of desired dye, with an absorbance maximum of 630 nm, and an extinction coefficient of 24,565.

Materials for Examples 3 and 4

Materials used in the Examples 3-4 include the following: ethylcellulose Aqualon® N50 (48.0-49.5% ethoxyl content) polymeric binder from Hercules Chemical, Wilmington, Del., and Paraplex® G25 polyester sebacate ($T_m$ −20° C., $M_W$ 8000) from CP Hall Company.

Yellow Donor Element YDE-1:

A yellow dye-donor element for use in Examples 3-4 was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m$^2$) from n-propyl acetate and n-butyl alcohol solvent mixture; and (2) a dye-donor layer containing a composition of Yellow Dyes Y-2, Y-3 and Y-4 as follows: Yellow Dye Y-2 at 0.1117 g/m$^2$ and Yellow Dye Y-3 at 0.0192 g/m$^2$ and Yellow Dye Y-4 at 0.0559 g/m$^2$, AQUALON® N50 (Hercules Chemical, Wilmington, Del.) binder at 0.1149 g/m$^2$, Paraplex® polyester at 0.0059 g/m$^2$, and 2 micron divinyl benzene beads at 0.0037 g/m$^2$ coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m$^2$) from n-propyl acetate and n-butyl alcohol solvent mixture, and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

Magenta Donor Element MDE-1:

A magenta dye-donor element was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m$^2$) from n-propyl acetate and n-butyl alcohol solvent mixture; and (2) a dye-donor layer containing a composition of Magenta Dyes as follows: Magenta Dye M-1 at 0.0128 g/m$^2$, Magenta Dye M-2 at 0.1602 g/m$^2$, and Magenta Dye M-4 at 0.0832 g/m$^2$, AQUALON® N50 (Hercules Chemical, Wilmington, Del.) binder at 0.1465 g/m$^2$, Paraplex® polyester at 0.019 g/m$^2$ and 2 micron divinyl benzene beads at 0.005 g/m$^2$ were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m$^2$) from n-propyl acetate and n-butyl alcohol solvent mixture, and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

Comparison Cyan Donor Element CDE-1:

A cyan dye-donor element for use was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m$^2$) from n-propyl acetate and n-butyl alcohol solvent mixture; and (2) a dye-donor layer containing a composition of Cyan Dyes as follows: Cyan Dye C-4 at 0.0914 g/m², Cyan Dye C-5 at 0.1524 g/m², and Cyan Dye C-6 at 0.061 g/m², AQUALON® N50 (Hercules Chemical, Wilmington, Del.) binder at 0.1137 g/m², Paraplex® polyester at 0.0213 g/m² and 2 micron divinyl benzene beads at 0.0078 g/m² and were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m²) from n-propyl acetate and n-butyl alcohol solvent mixture, and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Inventive Cyan Donor Element CDE-2:

A cyan dye-donor element for use in was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m²) from n-propyl acetate and n-butyl alcohol solvent mixture; and (2) a dye-donor layer containing a composition of Cyan Dyes as follows: Cyan Dye C-4 at 0.0914 g/m², Cyan Dye C-5 at 0.1524 g/m², and Cyan Dye CD chosen from Table 1 at 0.061 g/m², AQUALON® N50 (Hercules Chemical, Wilmington, Del.) binder at 0.1137 g/m², Paraplex® polyester at 0.0213 g/m² and 2 micron divinyl benzene beads at 0.0078 g/m² and were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m²) from n-propyl acetate and n-butyl alcohol solvent mixture, and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Laminate Layer:

A laminate donor element was prepared by coating on the back side of a 4.5 μm poly(ethylene terephthalate) support, in order:

(1) a subbing layer of titanium alkoxide, Tyzor TBT®, (DuPont Corp.) (0.13 g/m²) from a n-propyl acetate and n-butyl alcohol solvent mixture (85/15), and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone On the front side of the element was coated a transferable overcoat layer containing colloidal silica, IPA-ST (Nissan Chemical Co.), at a laydown of 0.46 g/m², Tinuvin 460® (Ciba Specialty Chemicals), a UV absorbing triazine, at a laydown of 0.11 g/m², poly(vinyl acetal), KS-10, (Sekisui Co.), at a laydown of 0.63 g/m², and 4 μm divinylbenzene beads at a laydown of 0.11 g/m². The materials were dissolved and coated from the solvent 3-pentanone. The laminate composition was the same for all examples.

Receiver

A receiver of the composition shown below was prepared, having an overall thickness of about 220 μm and a thermal dye receiver layer thickness of about 3 μm. It was prepared by solvent coating the subbing layer and dye receiving layer onto the prepared paper support. The receiver composition was the same for all examples.

---

4-8 μm divinyl benzene beads and solvent coated, cross-linked polyol dye receiving layer
Subbing layer
Microvoided composite film OPPalyte 350 K18 (ExxonMobil)
Pigmented polyethylene
Cellulose Paper
Polyethylene
Polypropylene film

---

Procedure

A 15-step patch image of optical density (OD) ranging from $D_{min}$ (OD <0.2) to $D_{max}$ (OD >2.0) was printed for evaluation. When printed using 1.007 msec/line and a resistive head voltage of 28.0 V, this is equivalent to equal energy increments ranging from a print energy of 0 Joules/cm² to a print energy of 1.788 Joules/cm². Printing was done manually as described below.

The dye side of the dye-donor element was placed in contact with the dye image-receiving layer of the receiver element of the same width to form a print assembly. The print assembly was fastened to a stepper motor-driven pulling device. The imaging electronics were activated, causing the pulling device to draw the print assembly between the print head and a roller at a rate of about 80 mm/sec. The printing line time was 1.007 msec/line. After each print, the dye-donor element and receiver element were separated manually. The process was repeated for printing each of a yellow, magenta, cyan, and laminate patch on the same receiver to form monochrome, bichrome, and neutral color patches, as known in the art. The Status A reflection density of each printed monochrome magenta, bichrome red (combination of yellow and magenta), bichrome blue (combination of magenta and cyan), and neutral (combination of yellow, magenta, and cyan) patches of the final print 15-step patch image on the receiver was measured using Status A filters with an X-rite Model 820 Reflection Densitometer. The densities were reported as red of the cyan (R), blue of the green (BofG), red of the green (RofG), red of the blue (RofB), green of the blue (GofB), red of the neutral (RofN), green of the neutral (GofN), and blue of the neutral (BofN).

Example 3

Prints were prepared from Donor Elements YDE-1, MDE-1, and CDE-1 (Comparison) or CDE-2 (Invention) as described in Table 3. Print speed was 1.007 msec/line and a resistive head voltage of 28.0 V. The maximum density of the printed images were measured and compared. The results of the tests are as follows:

TABLE 3

Maximum density of images printed at 1.007 msec/line at 28 V

| Cyan Dyes | Donor Elements | Cyan R | Bichrome Green | | Bichrome Blue | | Neutral | | |
|---|---|---|---|---|---|---|---|---|---|
| | | | B of G | R of G | G of B | R of B | R of N | G of N | B of N |
| C-4, C-5, C-6 (Comparison) | YDE-1 MDE-1 CDE-1 | 1.96 | 2.69 | 1.91 | 2.71 | 2.07 | 2.04 | 2.70 | 2.67 |
| C-4, C-5, CD-1 (Invention) | YDE-1 MDE-1 CDE-2 | 2.12 | 2.64 | 2.05 | 2.61 | 2.20 | 2.15 | 2.60 | 2.67 |
| C-4, C-5, CD-2 (Invention) | YDE-1 MDE-1 CDE-2 | 2.17 | 2.62 | 2.13 | 2.60 | 2.24 | 2.17 | 2.55 | 2.56 |

As shown in the Table 3 above the compounds of this invention demonstrate higher red density than a comparison not containing the dyes of this invention. Further the dyes of this invention impart less unwanted green absorbance in the blue image and neutral image than a comparison not containing the dyes of this invention.

Example 4

Prints were prepared from Donor Elements YDE-1, MDE-1, and CDE-1 (Comparison) or CDE-2 (Invention) as described in Table 4. Print speed was 1.007 msec/line and a resistive head voltage of 28.0 V. The printed images were subjected to High-Intensity Daylight fading for 14 days at 50 Klux, 5400 K light using a Xenon light source, at 32° C. and approximately 25% RH, after which the Status A densities were read. The percent density loss after fade was calculated from a step with an initial density of approximately 1.0. The results of the simulated daylight fade testing are as follows:

TABLE 4

Percent density loss from 1.0 on 14 day 50 Klux illumination

| Cyan Dyes | Donor Elements | Cyan R | Bichrome Green | | Bichrome Blue | | Neutral | | |
|---|---|---|---|---|---|---|---|---|---|
| | | | B of G | R of G | G of B | R of B | R of N | G of N | B of N |
| C-4, C-5, C-6 (Comparison) | YDE-1 MDE-1 CDE-1 | 6.5 | 5.8 | 14.7 | 7.7 | 12.3 | 19.1 | 9.6 | 5.5 |
| C-4, C-5, CD-1 (Invention) | YDE-1 MDE-1 CDE-2 | 5.0 | 5.7 | 12.7 | 6.0 | 11.5 | 17.6 | 8.3 | 6.3 |
| C-4, C-5, CD-2 (Invention) | YDE-1 MDE-1 CDE-2 | 5.2 | 5.7 | 13.8 | 8.1 | 13.2 | 19.8 | 9.9 | 7.1 |

As shown in the Table 4 above the compounds of this invention demonstrate better light stability than a comparison not containing the dyes of this invention, and are particularly suitable for improved image stability of the monochrome cyan image and bichrome green image. Particularly preferred is the compound CD-1 which also imparts superior stability to the red and green of the neutral images.

The invention has been described in detail with particular reference to certain preferred embodiments thereof, but it will be understood that variations and modifications can be effected within the spirit and scope of the invention.

The invention claimed is:

1. A cyan dye donor element for thermal transfer imaging comprising a support having thereon a dye layer comprising a mixture of at least two cyan dyes dispersed in a polymeric binder, wherein at least one of said at least two cyan dyes is a light stabilizing dye represented by Formula I:

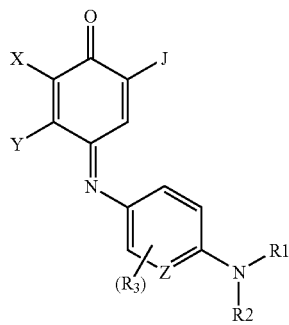

wherein
- R₁ and R₂ are substituted or unsubstituted alkyl, cycloalkyl, or aryl, or combine to form a carbocyclic or heterocyclic ring;
- R₃ is hydrogen, halogen, alkoxy, substituted or unsubstituted alkyl, NHCOR₁, NHSO₂R₁, or combines with either R₁ or R₂ to form a carbocyclic or heterocyclic ring;
- X is halogen;
- Y is alkyl;
- Z is carbon or nitrogen;
- J is NHCOR₄;
- R₄ is R₅Phenyl(OR₇)m;
- R₅ is a carbon-carbon single bond, —(CHR₆)n-, or —(CH₂)pO—;
- R₆ is hydrogen, substituted or unsubstituted alkyl;
- R₇ is substituted or unsubstituted alkyl, carbocycle or heterocycle;
- m is 2-5;
- n is 0-6;
- p is 2-5;
- the formula weight of R₄ does not exceed 230.

2. The cyan dye donor element of claim 1 wherein the formula weight of said dye of Formula I does not exceed 600.

3. The cyan dye donor element of claim 1 wherein said at least one of said at least two cyan dyes is represented by the following structure CD-1:

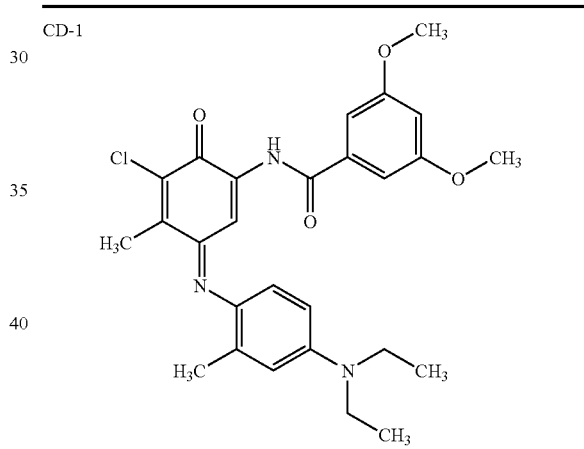

4. The cyan dye donor element of claim 1 wherein said at least one of said at least two cyan dyes is represented by the following structure CD-2:

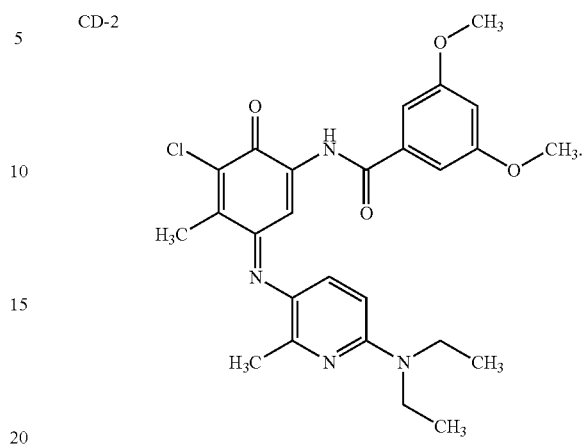

5. The cyan dye donor element of claim 1 wherein said at least one of said at least two cyan dyes is represented by at least one structure selected from the group consisting of:

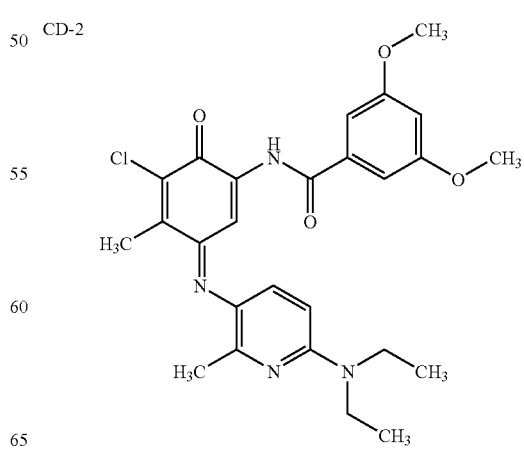

-continued
CD-4
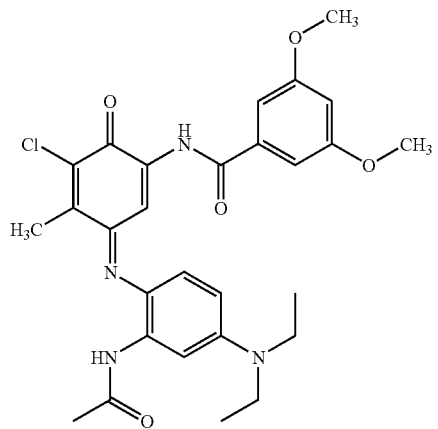
CD-17
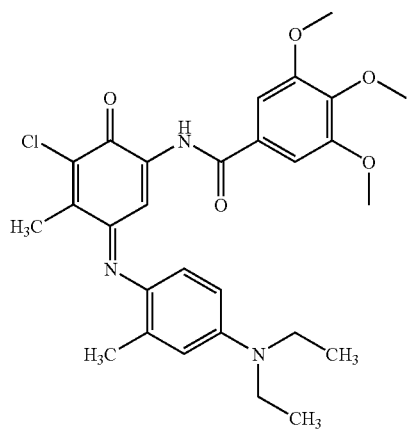
CD-18
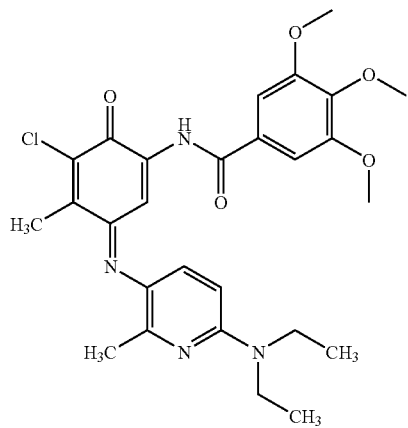
-continued
CD-20
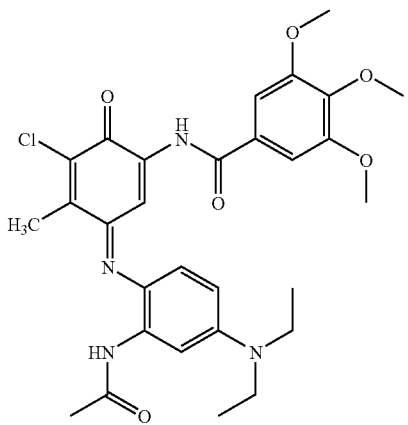
CD-24
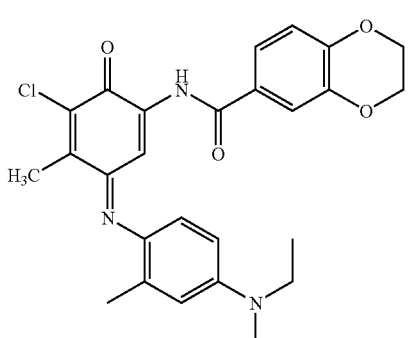
CD-26
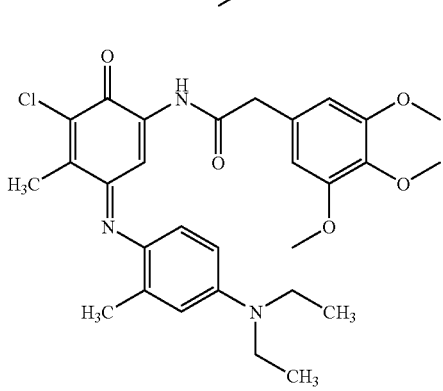
CD-27
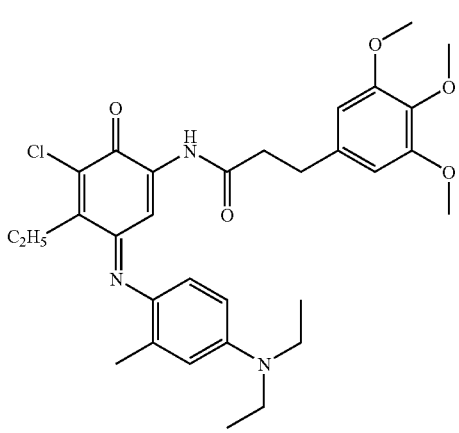

-continued and

CD-28

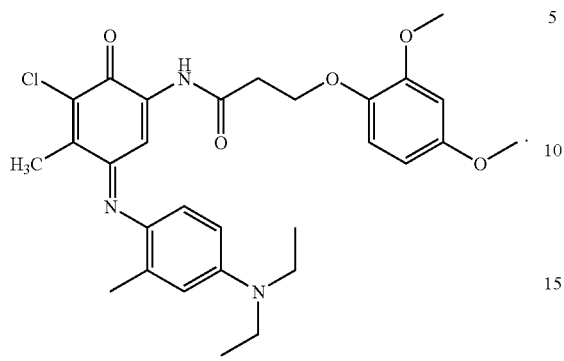

6. The cyan dye donor element of claim 1 wherein said cyan dye donor element is a dye diffusion or sublimation cyan dye donor element.

7. The cyan dye donor element of claim 1 wherein said polymeric binder comprises ethyl cellulose.

8. An imaging system comprising an image receiving sheet having a dye receiving layer on a substrate and a cyan dye donor element for thermal transfer imaging comprising a support having thereon a dye layer comprising a mixture of at least two cyan dyes dispersed in a polymeric binder, wherein at least one of said at least two cyan dyes is a light stabilizing dye represented by Formula I:

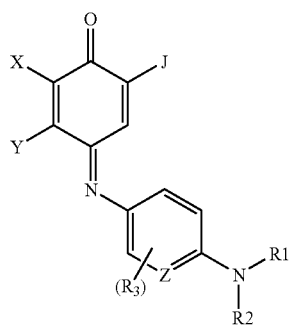

wherein
  $R_1$ and $R_2$ are substituted or unsubstituted alkyl, cycloalkyl, or aryl, or combine to form a carbocyclic or heterocyclic ring;
  $R_3$ is hydrogen, halogen, alkoxy, substituted or unsubstituted alkyl, $NHCOR_1$, $NHSO_2R_1$, or combines with either $R_1$ or $R_2$ to form a carbocyclic or heterocyclic ring;
  X is halogen;
  Y is alkyl;
  Z is carbon or nitrogen;
  J is $NHCOR_4$;
  $R_4$ is $R_5Phenyl(OR_7)m$;
  $R_5$ is a carbon-carbon single bond, $-(CHR_6)n-$, or $-(CH_2)pO-$;
  $R_6$ is hydrogen, substituted or unsubstituted alkyl;
  $R_7$ is substituted or unsubstituted alkyl, carbocycle or heterocycle;

m is 2-5;
n is 0-6;
p is 2-5;
the formula weight of $R_4$ does not exceed 230; and
wherein said imaging system is a dye thermal system used to prepare prints from electronic images.

9. The imaging system of claim 8 wherein said at least one of said at least two cyan dyes is represented by the following structure CD-1:

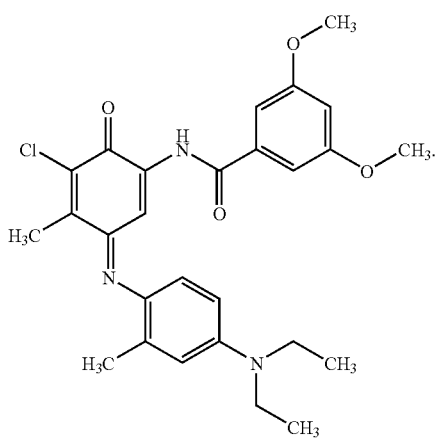

10. The imaging system of claim 8 wherein said at least one of said at least two cyan dyes is represented by the following structure CD-2:

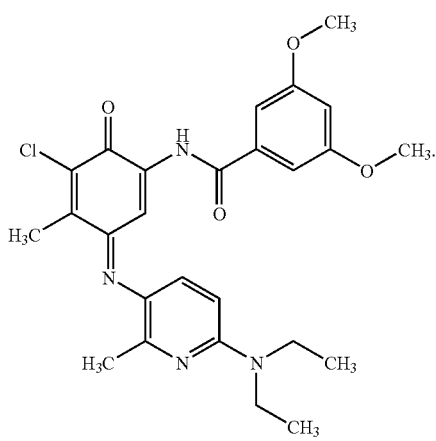

11. The imaging system of claim 8 wherein said at least one of said at least two cyan dyes is represented by at least one structure selected from the group consisting of:

CD-1
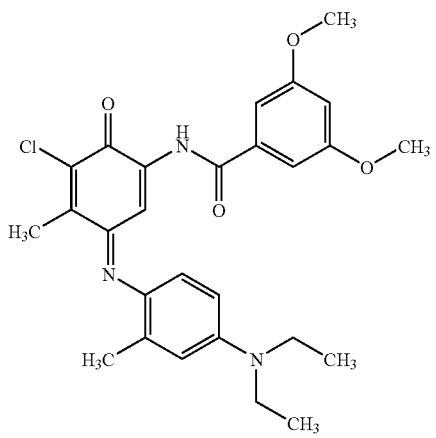
CD-2
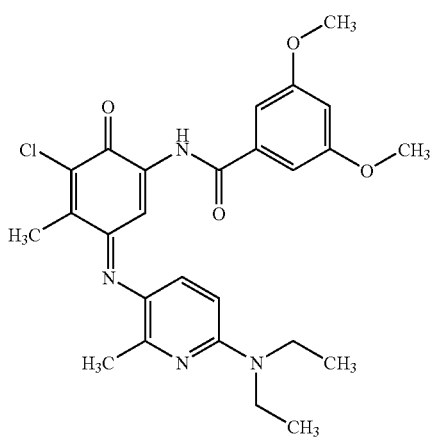
CD-4
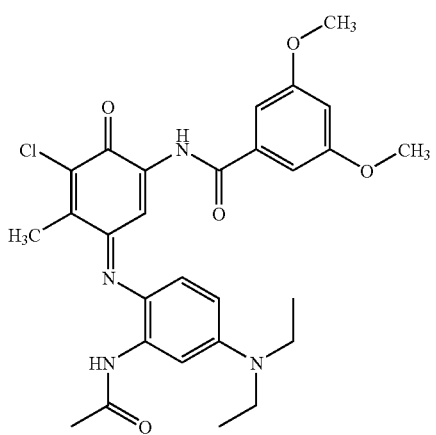
CD-17
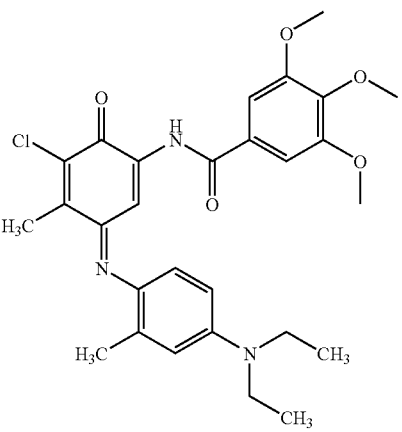
CD-18
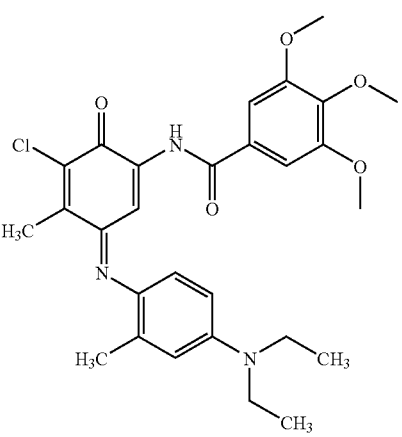
CD-20
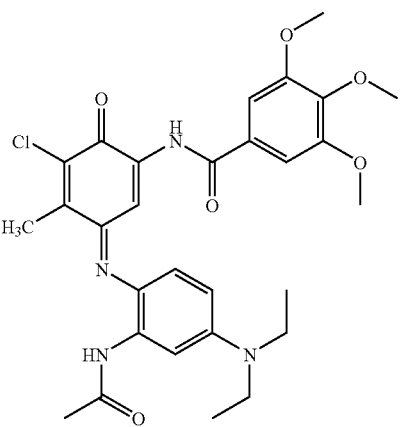

-continued

CD-24
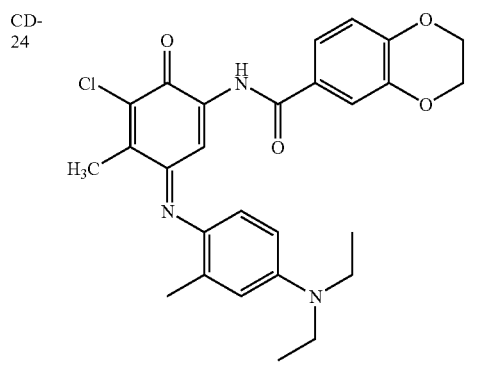

CD-26
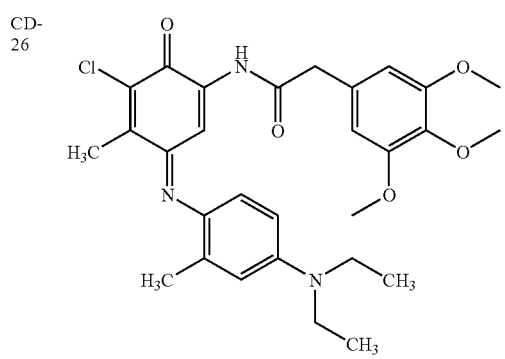

CD-27
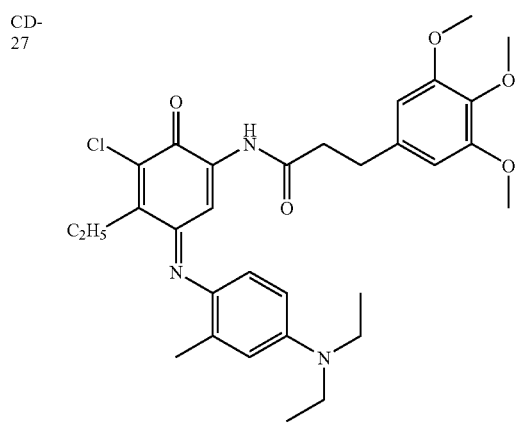

and
CD-28
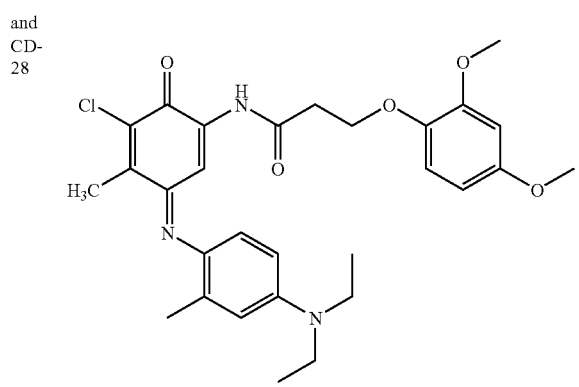

12. The imaging system of claim 8 wherein said cyan dye donor element is a dye diffusion or sublimation cyan dye donor element.

13. The imaging system of claim 8 wherein said polymeric binder comprises ethyl cellulose.

14. A thermal image recording method comprising:
   a. providing a cyan dye donor element for thermal dye diffusion or sublimation transfer comprising a support having thereon a dye layer comprising a mixture of at least two cyan dyes dispersed in a polymeric binder, wherein at least one of said at least two cyan dyes is a light stabilizing dye represented by Formula I:

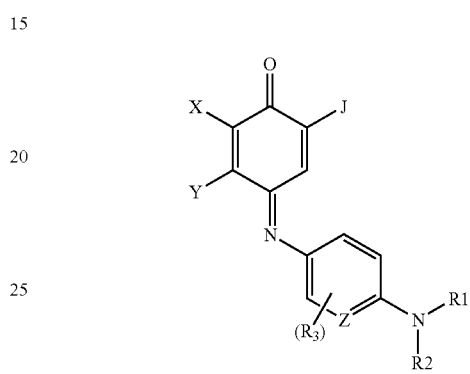

wherein
   $R_1$ and $R_2$ are substituted or unsubstituted alkyl, cycloalkyl, or aryl, or combine to form a carbocyclic or heterocyclic ring;
   $R_3$ is hydrogen, halogen, alkoxy, substituted or unsubstituted alkyl, $NHCOR_1$, $NHSO_2R_1$, or combines with either $R_1$ or $R_2$ to form a carbocyclic or heterocyclic ring;
   X is halogen;
   Y is alkyl;
   Z is carbon or nitrogen;
   J is $NHCOR_4$;
   $R_4$ is $R_5$Phenyl$(OR_7)$m;
   $R_5$ is a carbon-carbon single bond, $-(CHR_6)n-$, or $-(CH_2)pO-$;
   $R_6$ is hydrogen, substituted or unsubstituted alkyl;
   $R_7$ is substituted or unsubstituted alkyl, carbocycle or heterocycle;
   m is 2-5;
   n is 0-6;
   p is 2-5; and
   the formula weight of $R_4$ does not exceed 230;
   b. superimposing said cyan dye donor element on a dye receiving layer face of an image receiving sheet; and
   c. imagewise heating the said cyan dye donor element to transfer the dye from said cyan dye donor element to said image receiving sheet.

15. The thermal image recording method of claim 14 wherein said at least one of said at least two cyan dyes is represented by the following structure CD-1:

CD-1
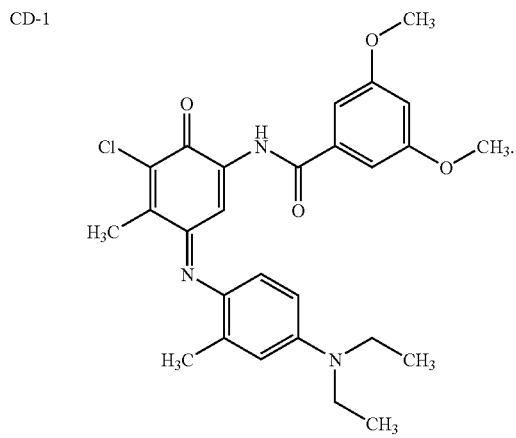
16. The thermal image recording method of claim 14 wherein said at least one of said at least two cyan dyes is represented by the following structure CD-2:
CD-2
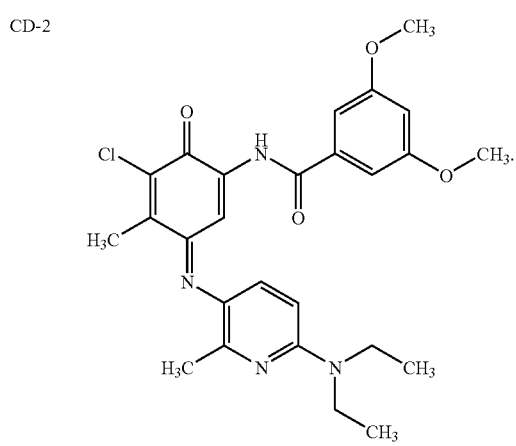
17. The thermal image recording method of claim 14 wherein said at least one of said at least two cyan dyes is represented by at least one structure selected from the group consisting of:
CD-1
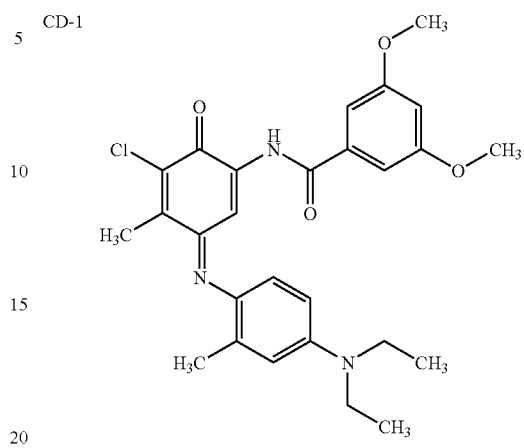
CD-2
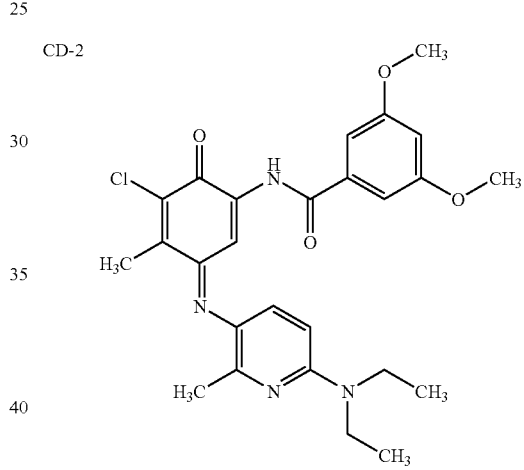
CD-4
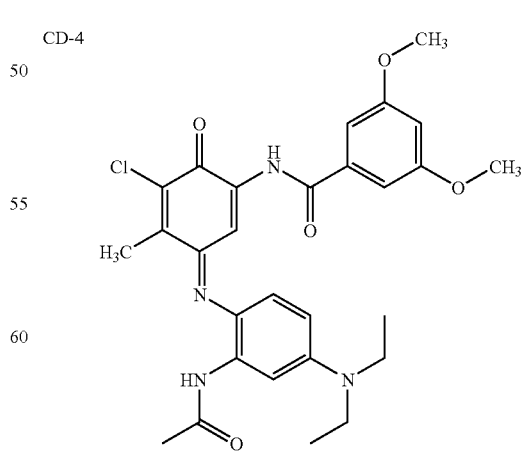

-continued
CD-17
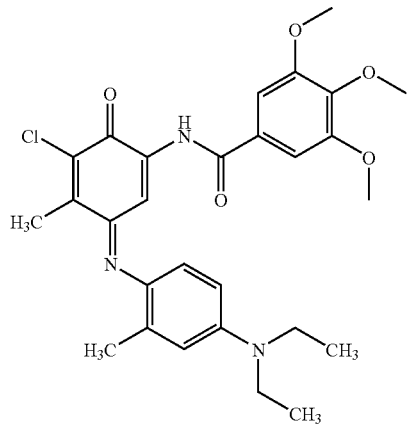
CD-18
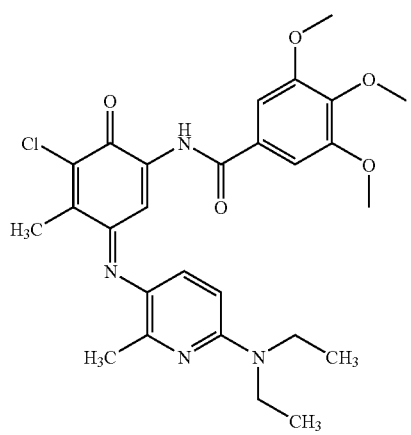
CD-20
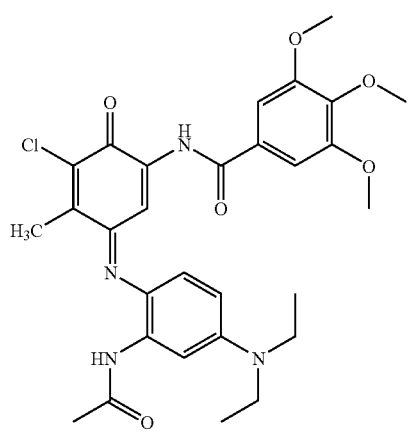
-continued
CD-24
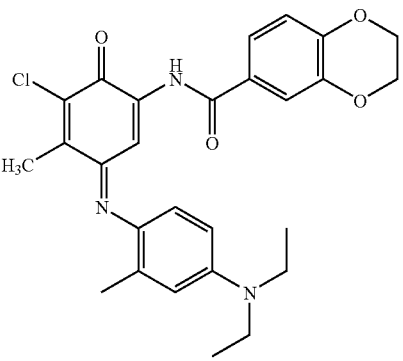
CD-26
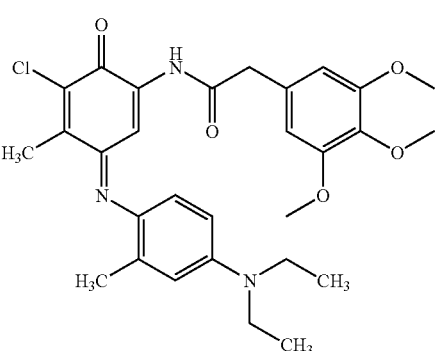
CD-27
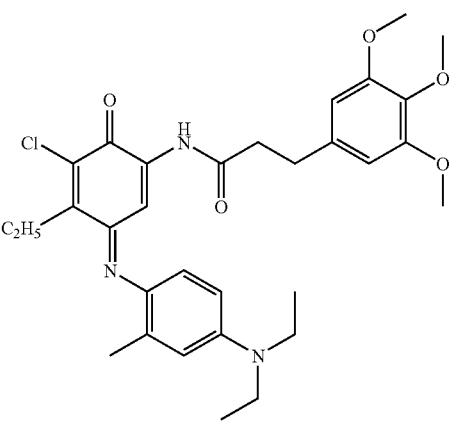
and
CD-28
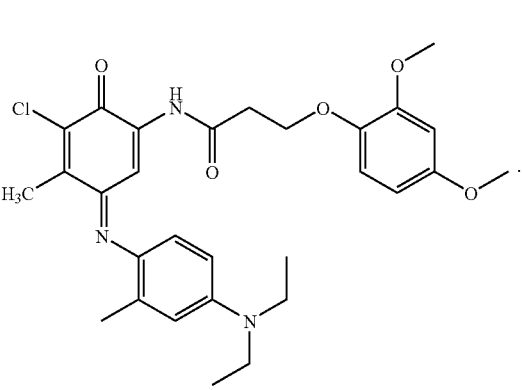
18. The thermal image recording method of claim 14 wherein said cyan dye donor element is a dye diffusion or sublimation cyan dye donor element.

19. The thermal image recording method of claim 14 wherein said polymeric binder comprises ethyl cellulose.

20. A cyan inkjet dye comprising a light stabilizing cyan dye represented by Formula I:

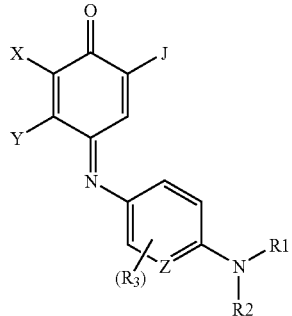

wherein
- $R_1$ and $R_2$ are substituted or unsubstituted alkyl, cycloalkyl, or aryl, or combine to form a carbocyclic or heterocyclic ring;
- $R_3$ is hydrogen, halogen, alkoxy, substituted or unsubstituted alkyl, $NHCOR_1$, $NHSO_2R_1$, or combines with either $R_1$ or $R_2$ to form a carbocyclic or heterocyclic ring;
- X is halogen;
- Y is alkyl;
- Z is carbon or nitrogen;
- J is $NHCOR_4$;
- $R_4$ is $R_5$-Phenyl$(OR_7)$m;
- $R_5$ is a carbon-carbon single bond, —$(CHR_6)$n-, or —$(CH_2)$pO—;
- $R_6$ is hydrogen, substituted or unsubstituted alkyl;
- $R_7$ is substituted or unsubstituted alkyl, carbocycle, or heterocycle;
- m is 2-5;
- n is 0-6;
- p is 2-5; and
- wherein said dye is at least one dye for use in an inkjet color hard copy system.

* * * * *

UNITED STATES PATENT AND TRADEMARK OFFICE
CERTIFICATE OF CORRECTION

| | |
|---|---|
| PATENT NO. | : 7,781,373 B2 |
| APPLICATION NO. | : 11/626890 |
| DATED | : August 24, 2010 |
| INVENTOR(S) | : Donald R. Diehl et al. |

It is certified that error appears in the above-identified patent and that said Letters Patent is hereby corrected as shown below:

| Issued Patent | | Description of Error |
|---|---|---|
| Column | Line | |
| 52 | 26-44 (Approx.) | In Claim 11, delete 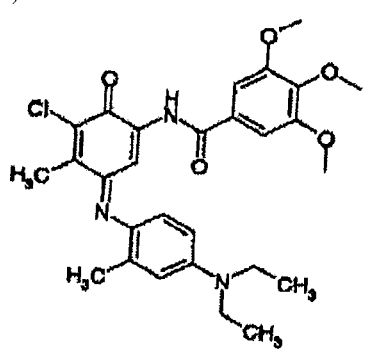 " " and insert 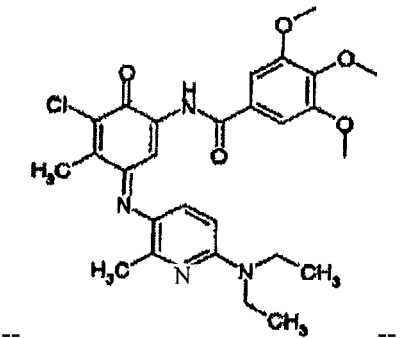 -- -- |
| 60 | 9 (Approx.) | In Claim 20, delete "$R_5$-Phenyl($OR_7$)m;" and insert --$R_5$Phenyl($OR_7$)m;-- |

Signed and Sealed this
Fourteenth Day of August, 2012

David J. Kappos
*Director of the United States Patent and Trademark Office*